United States Patent
Kraft et al.

(10) Patent No.: US 11,492,966 B2
(45) Date of Patent: Nov. 8, 2022

(54) METHODS OF MODIFYING EXISTING GAS TURBINE ENGINE DESIGN TO CREATE A COMBINED STORAGE ENGINE AND SIMPLE CYCLE PEAKER PRODUCT

(71) Applicant: T-Phase Engine LLC, Jupiter, FL (US)

(72) Inventors: Robert J. Kraft, Tequesta, FL (US); Joshua J. Kraft, Tequesta, FL (US)

(73) Assignee: Powerphase International, LLC, Hobe Sound, FL (US)

(*) Notice: Subject to any disclaimer, the term of this patent is extended or adjusted under 35 U.S.C. 154(b) by 0 days.

(21) Appl. No.: 17/191,450

(22) Filed: Mar. 3, 2021

(65) Prior Publication Data

US 2021/0277825 A1 Sep. 9, 2021

Related U.S. Application Data

(63) Continuation-in-part of application No. 17/117,110, filed on Dec. 10, 2020.

(60) Provisional application No. 62/985,682, filed on Mar. 5, 2020, provisional application No. 62/945,690, filed on Dec. 9, 2019.

(51) Int. Cl.
*F02C 6/16* (2006.01)
*F01D 15/10* (2006.01)

(52) U.S. Cl.
CPC ............... *F02C 6/16* (2013.01); *F01D 15/10* (2013.01); *F05D 2230/80* (2013.01); *F05D 2240/40* (2013.01); *F05D 2240/52* (2013.01); *F05D 2260/42* (2013.01); *Y02E 60/16* (2013.01)

(58) Field of Classification Search
CPC ............... F02C 6/14; F02C 6/16; Y02E 60/16
See application file for complete search history.

(56) References Cited

U.S. PATENT DOCUMENTS

| | | | | |
|---|---|---|---|---|
| 4,522,024 A | * | 6/1985 | Zaugg | F02C 6/16 60/727 |
| 4,872,307 A | * | 10/1989 | Nakhamkin | F02C 6/16 60/39.15 |
| 10,215,060 B2 | * | 2/2019 | Kraft | F02C 7/1435 |
| 2003/0033812 A1 | * | 2/2003 | Gerdes | F02C 6/16 60/772 |
| 2010/0083660 A1 | * | 4/2010 | Nakhamkin | F02C 6/16 60/327 |
| 2014/0096523 A1 | * | 4/2014 | Coney | F01K 23/06 60/670 |
| 2014/0096531 A1 | * | 4/2014 | Coney | F01K 23/10 60/772 |
| 2015/0192065 A1 | * | 7/2015 | Alekseev | F02C 3/22 60/407 |
| 2015/0233296 A1 | * | 8/2015 | Kraft | F02C 7/22 60/776 |

FOREIGN PATENT DOCUMENTS

DE 102014104452 A1 * 10/2014 ............... F02C 3/04

* cited by examiner

*Primary Examiner* — Laert Dounis
(74) *Attorney, Agent, or Firm* — Avek IP, LLC

(57) ABSTRACT

A method of modifying an existing gas turbine to create a storage engine, the gas turbine having a combustor, a compressor section, and a turbine section, the method comprising modifying the compressor section of the gas turbine to form the storage engine such that air supplied to the combustor of the storage engine is heated by exhaust of the storage engine and is supplied from a remote source.

9 Claims, 14 Drawing Sheets

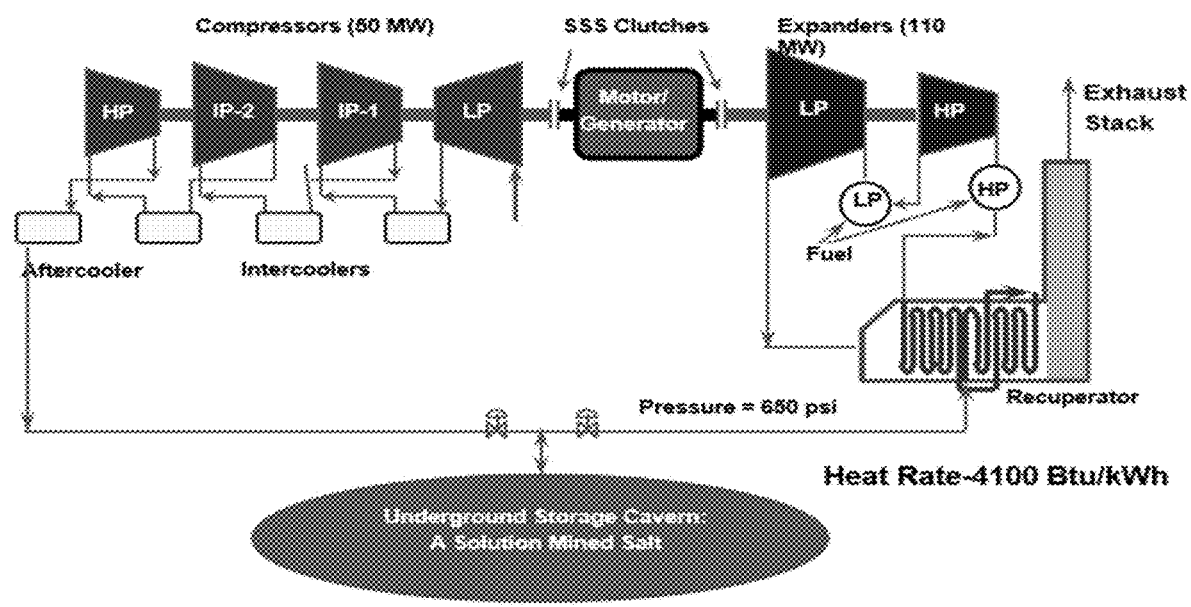
FIG. 1A – PRIOR ART

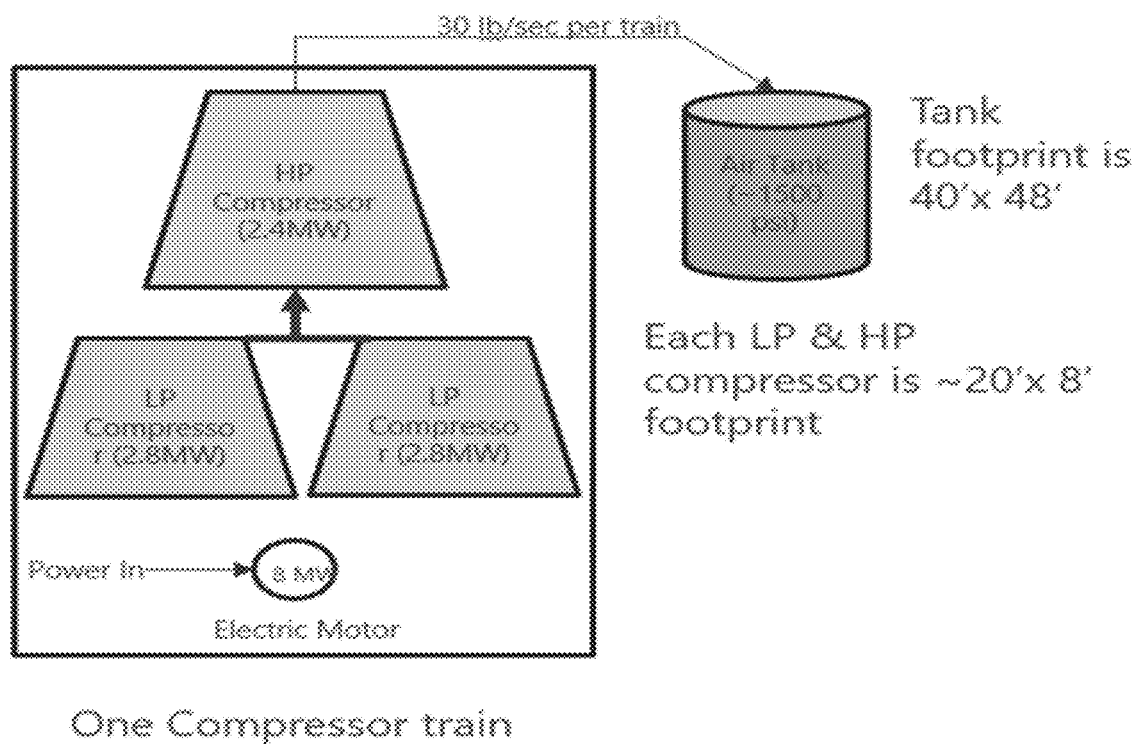
FIG. 1B – PRIOR ART

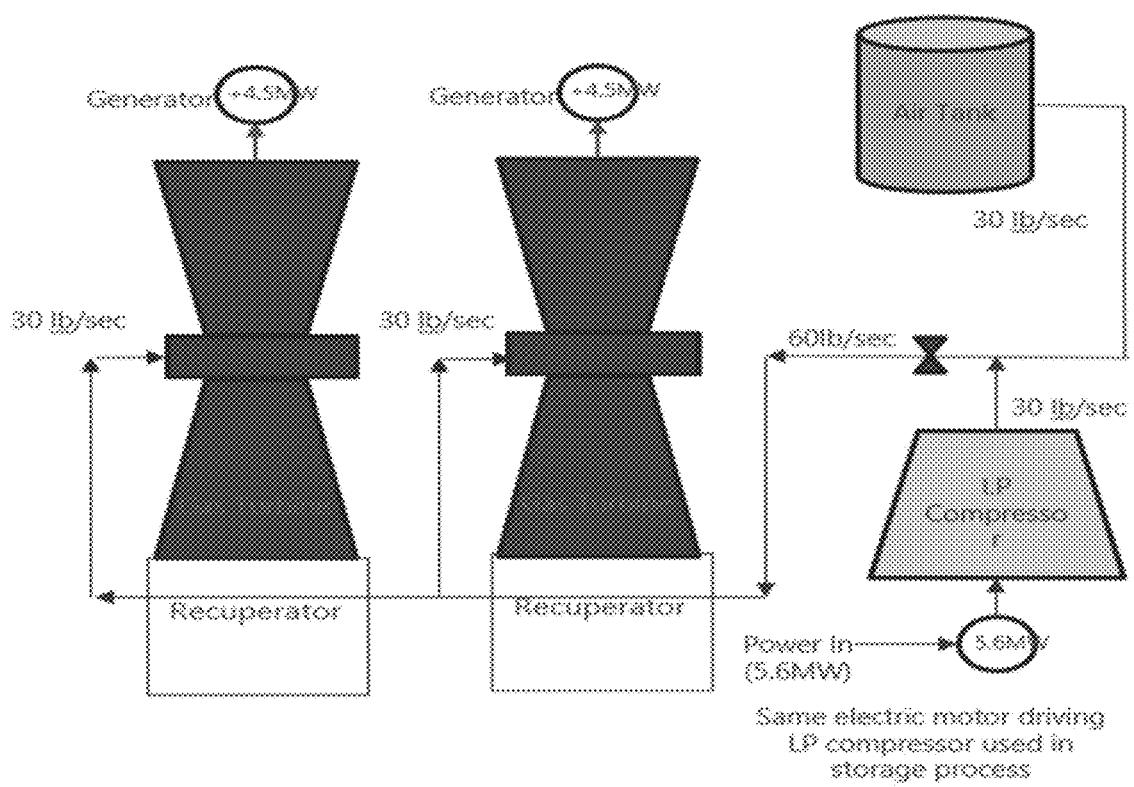
FIG. 1C – PRIOR ART

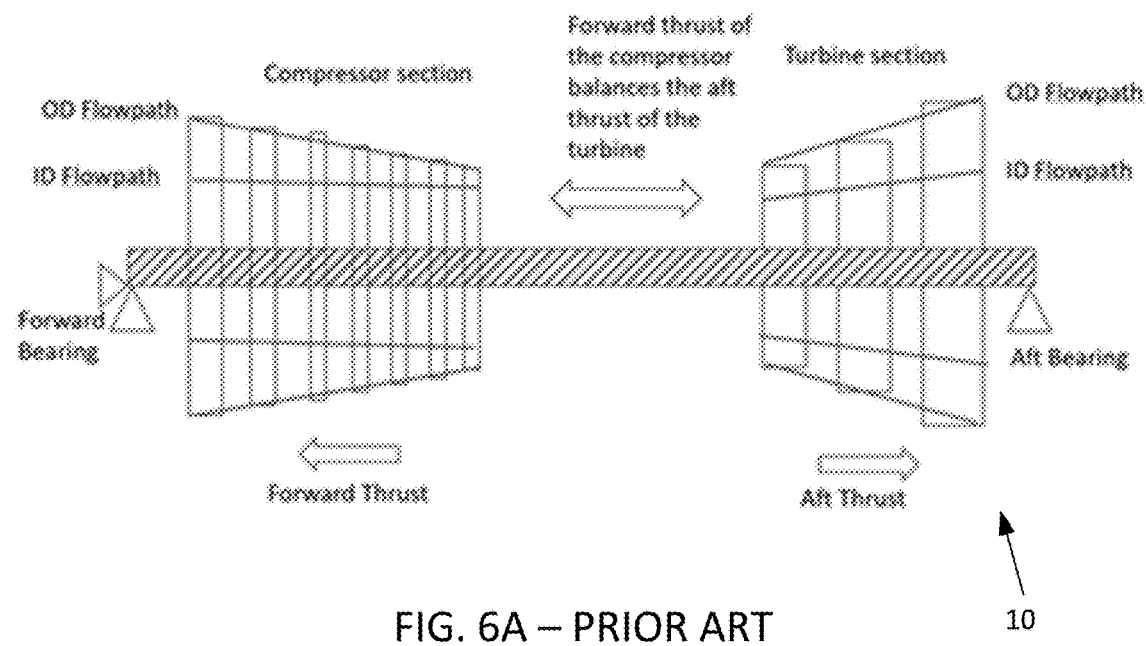
FIG. 6A – PRIOR ART
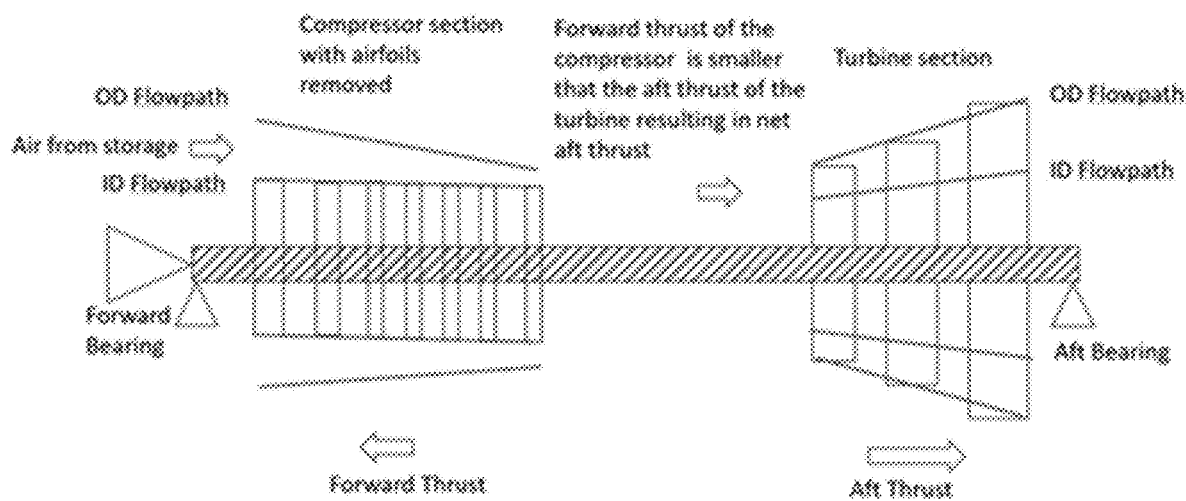
FIG. 6B

METHODS OF MODIFYING EXISTING GAS TURBINE ENGINE DESIGN TO CREATE A COMBINED STORAGE ENGINE AND SIMPLE CYCLE PEAKER PRODUCT

RELATED APPLICATIONS

This application is a continuation-in-part of U.S. patent application Ser. No. 17/117,110 filed Dec. 10, 2020, which claims priority to U.S. Provisional Application No. 62/945,690 filed Dec. 9, 2019. This application also claims priority to U.S. Provisional Application No. 62/985,682, filed on Mar. 5, 2020. The disclosure of each of these applications is incorporated by reference in its entirety.

FIELD OF THE DISCLOSURE

The disclosure relates generally to electrical power systems and methods. More specifically, the disclosure relates to methods of converting a gas turbine power plant to a grid scale energy storage plant with a continuous peaking output mode.

SUMMARY

In an embodiment, a method of modifying an existing gas turbine to create a storage engine, the gas turbine having a combustor, a compressor section, and a turbine section, the method comprising modifying the compressor section of the gas turbine to form the storage engine such that air supplied to the combustor of the storage engine is heated by exhaust of the storage engine and is supplied from a remote source.

In another embodiment, a method of modifying an existing gas turbine to create a storage engine, the gas turbine having a combustor, a compressor section, and a turbine section, the method comprising modifying the compressor section of the gas turbine to form the storage engine such that air supplied to the combustor of the storage engine is heated by exhaust of the storage engine and is supplied from a remote source and a cooling air supply for later stages in the turbine section is supplied from air that is from the remote source and is heated by the exhaust of the storage engine to a temperature lower than the temperature of air being introduced into the combustor of the storage engine.

In yet another embodiment, a method of modifying an existing gas turbine to create a storage engine, the storage engine having at least a substantially unmodified gas turbine combustor and turbine section and a modified compressor section such that air supplied to the combustor of the storage engine is heated by exhaust of the storage engine and is supplied from a remote source and the cooling air supply for later stages in the turbine section is supplied from air that is from the remote source and heated by the exhaust of the storage engine to the same temperature as the temperature of the air being introduced into the combustor of the storage engine, but then blended with cooler air from the remote source to form a supply of cooling air the later stages of the turbine section that is cooler than the air entering the storage engine's combustion section.

BRIEF DESCRIPTION OF THE SEVERAL VIEWS OF THE DRAWINGS

Illustrative embodiments of the present disclosure are described in detail below with reference to the attached drawing figures.

FIG. 1A is a schematic layout of a PRIOR ART CAES plant.

FIG. 1B is a schematic representation of a PRIOR ART compressor train.

FIG. 1C is a schematic representation of a PRIOR ART energy storage system.

FIG. 6A is a schematic representation of a PRIOR ART gas turbine compressor.

FIGS. 6B-6C are schematic representations of various modified compressors of the T-Phase Engine of FIG. 2, in an embodiment.

DETAILED DESCRIPTION

Figure 2:
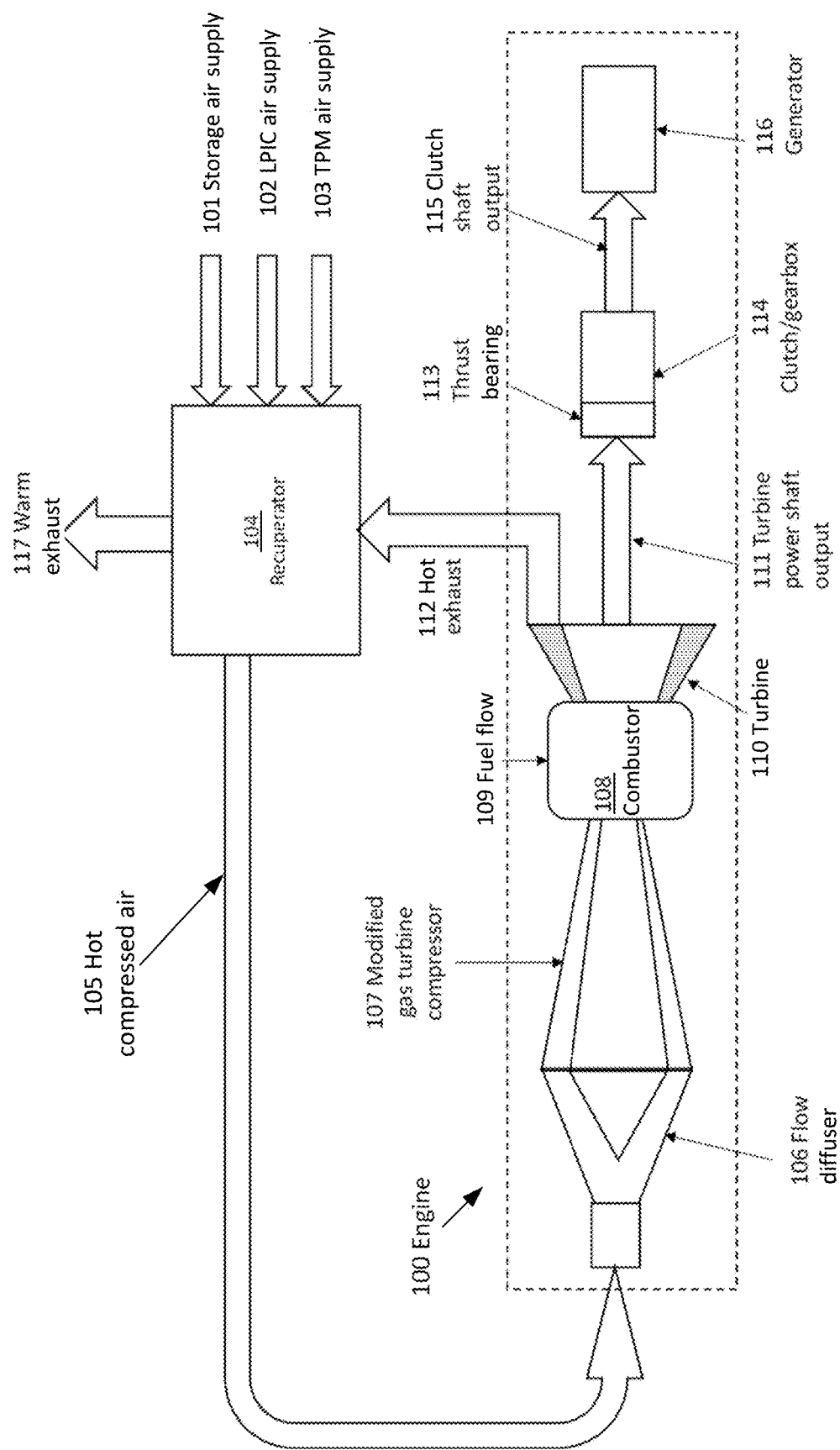
FIG. 2 is a schematic representation of a T-Phase engine, according to an embodiment of the disclosure.

Powerphase of Jupiter, Fla. is a company with more than forty patents globally focused on developing products to help the current fleet of gas turbines in the world become more efficient and effective, while supporting renewable energy. For example, Powerphase has developed a patented air injection technology herein referred to as a "Turbophase" system, as seen in U.S. Pat. No. 9,388,737 B2 (the entirety of which is incorporated herein by reference), which is a hot air injection process to quickly increase the output power of a simple cycle or combined cycle gas turbine. One of the benefits of Turbophase may be the speed at which it can add power to a power plant. Specifically, the speed at which Turbophase may add power to a power plant may be similar to or faster than the traditional ramping rate of a gas turbine. Powerphase also has an energy storage product herein referred to as a "Fastlight" system, that may inject hot air into the gas turbine and may produce the same or similar benefits as Turbophase. A benefit unique to Fastlight may be that air is compressed and stored using off peak energy while additional power is delivered on peak. Combining the Turbophase and Fastlight systems with a gas turbine may add more power output (e.g., 10%-20% or so more power) to a system, which may be beneficial. However, because of the fundamental limitations of the gas turbine, the minimum load of the gas turbine may not be improved (i.e., reduced), and the use of these two systems may be required to be used in conjunction with a gas turbine.

In many parts of the world there is a large push towards renewable energy and there is a fundamental limit of how much renewable energy can be put on the grid without causing catastrophic issues like black outs. Depending on the make-up of what is on the grid to provide power and shed load dictates how much energy can be effectively managed on the grid. For example, in in areas of the U.S. with 20-30% capacity of renewable energy installed, the grids have been able to manage the load fluctuations by ramping gas turbines, load shedding, and using predictive tools to predict the fluctuations in the availability of the renewable resource. However, in Australia where they have approximately 30% renewable capacity installed, for example, the country predominately runs on coal and does not have a high capacity of gas turbines to shore up the shortcomings of the renewable energy. Consequently, they must perform frequent maintenance due to wear from cycling their systems. There are not enough fast acting gas turbine plants running to stabilize the grid during these maintenance trips, and thus their grid suffers from instability and black outs.

A solution that has been highly sought after globally to address this issue and allow for a higher renewable energy penetration is energy storage. There are many forms of energy storage. However, if one looks at grid scale storage, there have only been a few different forms that have been acted upon. Hydroelectric generators can generate large amounts of power, but they are geographically constrained and create many environmental issues. Batteries have been installed in large capacities, however, batteries suffer from being extremely expensive on top of providing some environmental concerns (e.g., via dangerous chemicals, disposal, etc.) when the batteries wear out. Compressed Air Energy Storage (CAES) systems have been used, but they are also geographically constrained and have many environmental issues as well. As a result, very few CAES plants have been built. All of these energy storage solutions attempt to address daily, weekly, or monthly cycles caused by renewable energy's intermittent lack of availability, but they all lack the ability to address seasonal energy storage. Consequently, electrical grids are made up of a significant amount of stand-by or "peaker" gas turbines that can react to the net load demands between the actual load being consumed and the renewable energy power supply.

Many utilities in the U.S. are challenged to meet the goal of increasing their renewable energy capacity and reducing their fuel consumption, while at the same time minimizing the cost to the end power consumer. As a result, some utilities in the U.S. are evaluating converting their combined cycle gas turbines to have the ability to run in simple cycle (by adding a bypass exhaust duct), which adds additional flexibility to a gas turbine plant because it reduces the gas turbine start-up time from 1-2 hours to 15 minutes. At the same time, peaking capacity is added. Some very efficient and highly sophisticated combined cycle gas turbine plants are being shut down because they are not able to respond fast enough to the net load demand.

Other issues with renewable energy stems from their inconsistent ramp rates and predictability. For example, wind energy is fairly predictable but has a much lower ramp rate than solar energy. Typically, wind blows towards a given location from the same direction on a daily basis with a seasonal trend. It can be measured at different locations, compared with weather predictions, and has ramp rates typically in the ten minute range. Solar energy, however, is more sporadic, is much harder to predict, and can have a ramp rate of one minute.

Large scale energy storage has been proven in the U.S., however the commercial application of this product is very limited due to the challenges mentioned above. In 1991 the Alabama Compressed Air Energy Storage (CAES) Plant was commissioned. FIG. 1A shows the general arrangement of this plant. Ambient air is compressed in one 50 MW compressor train and stored in an underground cavern with a capacity to store for 26 hours. When the air is released from the cavern at 650 psi, it is first heated in a recuperator and then sent to a high pressure burner, expanded in a specially designed High Pressure (HP) turbine, then reheated in a low pressure burner, and further expanded to atmosphere in a modified turbine (501D type). If one divides the fuel consumption by the net power output during the power cycle, and ignores any energy associated with the compression cycle, the heat rate is 4,100 BTU/kWh. The main issue holding this technology back from widespread adoption is the fact that it needs to be co-located with an underground cavern and there are not that many places in the world where this can be done. The locations for these facilities need to be both near load pockets and near areas that really need the energy storage. Another significant drawback is the system is more than 30 years old and utilizes specialty HP burners which have high NOx production and are not state of the art like what exists for gas turbines today. Another characteristic of this CAES system is that it operates at relatively high pressures compared to commercially available gas turbines which increases the air storage tank size required for a given number of hours of desired output. This may not have been an issue for CAES when using an underground cavern, however, when attempting to site this product and utilize above ground tank storage, it drives the cost extremely high. Another challenge for this system is that the compression cycle is binary (i.e., the systems is only either fully on or fully off), so there is very little flexibility on power consumption during the compression process because it uses one shaft line. Similarly, on the power cycle, because of the limitations on the HP expander section, there is not much turn down capability. In summary, although this product is relatively straight forward, is has severely limited implementation and has limited flexibility in its ability to ramp power consumption and power output. Also, just like every other energy storage system available today, once the charge is spent (i.e., the air tank is empty or discharged down to its usable pressure), the power cycle stops.

Powerphase, while producing and installing the Turbophase and Fastlight systems, realized that it was possible to add a continuous power mode to a gas turbine with continuous electric air injection storage system by breaking the compression process into two parts: a low pressure that is matched to the low pressure expander in the gas turbine and a high pressure that is matched to the maximum pressure of the air storage tank. Such an arrangement can be seen in more detail in U.S. Patent Pub. 2018/0156111 (the entirety of which is incorporated herein by reference), showing two stage compression with a continuous mode. The low pressure compressor may feed the high pressure compressor for the storage process and may be driven by two separate electric motors which allows for simple and separate operation. During the power mode, the low pressure compressor can be used to generate additional air flow to the gas turbine for incremental power, which may ultimately reduce the cost of the storage system on a cost per kilowatt basis (i.e., cost stays the same and kW output goes up). This also addresses the air storage tank sizing issue by reducing the volume and cost requirement for a given total mass flow requirement because additional air is generated in real time to supplement the air flow from the tank.

As another example, Powerphase has developed a commercial "Fastlight" system, as it is SOMETIMES referred to herein, that has one compressed air train (see FIG. 1B) consisting of two low pressure compressors (LPC) and one high pressure compressor (HPC) that consumes 2.8 MW per LPC and 2.4 MW for the HPC which equals 8 MW per compressor "train". The train delivers air at a total of 30 lb/sec to the storage tank at 1500 psi. However, the two LPCs can run independent of the HPC in the power generation mode and deliver 30 lb/sec to a Gas Turbine (GT) at ~180 psi. For instance, the Fastlight system may inject air into a GT (e.g., a 6B GT) and consume 5.6 MW during a continuous power generation mode. If the tank was sized for four hours of storage, then the total energy consumed would be 8*4 hrs=32 MWhr. It is also true that the LPC and HPC compressors do not consume as much power at low pressures compared to the peak pressure, so when the complete storage process is evaluated starting at a pressure similar to the output of the LPC and ending at the HPC maximum pressure, the average power consumed in that process is approximately 80% of the peak power, or in the example above, 0.8*32 MW=25.6 MW per hour on average over the charge cycle.

During the discharge power generation mode 30 lb/sec can be released from tank for four hours producing 9 MW net power output. In embodiments, the LPC can be run simultaneously with air being released from the storage tank which may add another 30 lb/sec of air, for a total of 60 lb/sec warm air for injection. When 60 lb/sec of air is injected into compressor discharge case of 2 6B gas turbines (see FIG. 1C), 30 lb/sec per GT, the GTs produce 18 MW of gross output increase. Because the LPCs are consuming 5.6 MW, this results in a net power output of 12.4 MW for four hours or a 50 MWhr output system. The fuel consumption for two 6B gas turbines with 30 lb/sec of air injection holding firing temperature constant is 50 MBTU/hr per GT, therefore the heat rate during injection resulting in 12.4 MW is 100,000,000 BTU/12,400 kW or 8064 BTU/kW hr incremental heat rate. If just the air is let out of the tank, the incremental power is 9 MW and the fuel burn is 50 MBtu/hr, or an incremental heat rate of 5,555 BTU/kWhr. The system also has a continuous "peaker" mode where the 30 lb/sec is injected into the gas turbines producing 9 MW gross, but netting out the 5.6 MW LPC load. This results in a 3.4 MW net while consuming 50 MBtu/hr, giving a heat rate of 14,700 BTU/kWhr. If, for example, the Fastlight system described above is sold for $6M USD, then the air discharged from the tank only would yield $6M/9000 kW, or $666/kW. When the LPC air is added, the cost per kW is reduced to $6M/12400 kW, or $483/kW which is a 27% cost reduction.

An alternative to the Fastlight technology is disclosed herein, which may in certain applications have specific advantages thereover. This alternative is sometimes referred to herein as "Turbophase" or "T-Phase" engine technology. The T-Phase engine technology may involve a more powerful grid scale energy storage system as well as a powerful peaker turbine engine. Where Fastlight is an air injection system for a running gas turbine, the T-Phase engine technology may be a new or modified gas turbine where the entire compression process is removed from the main shaft line of the gas turbine. The T-Phase engine technology may include new operation modes and, when combined with some existing technologies, may address one or more of the commercial drawbacks to a traditional CAES (or other) plant.

As discussed above, there are several issues holding traditional CAES technology back from widespread adoption: 1) it needs to be co-located with an underground cavern, 2) the system is decades old and utilizes specialty HP burners which have high NOx production and are not state of the art like what exists for gas turbines today, 3) it operates at relatively high pressures compared to commercially available gas turbines which increases the above ground air storage tank size required for a given number of hours of output desired, 4) the compression cycle is binary, so there is very little flexibility on power consumption during the compression process because it uses one shaft line, which also eliminates the possibility to have a peaker mode, 5) because of the limitations on the HP expander section, there is not much turn down capability, and 6) once the charge is spent, in this case the air tank is discharged down to its usable pressure, the power cycle stops. Embodiments of the T-Phase engine technology described herein may address the issues detailed above.

For example, embodiments of the grid scale energy storage plant systems described herein may address issues with conventional tank size and cost by expanding the pressure range that high pressure air storage above ground tanks can withstand, which may allow the system to be placed in locations otherwise unavailable to the prior art systems. Further, the T-Phase Engine may use single digit NOx state of the art combustors which may eliminate the need for expensive NOx selective catalytic reduction systems which can add 10% or more to the cost of the installation. The grid scale energy storage plant system embodiments described herein may allow for more efficient use of the air storage tanks. In the CAES product, if the storage pressure is 800 psi and the system is stopped at 300 psi, there is 500 psi of usable pressure, or 58% of the capacity of the system. Contrast this with the T-Phase Engine which, for example, may have a storage pressure of 1500 psi which can be discharged down to 206 psi in the case of a 6B gas turbine, resulting in a usable pressure range of 1294 psi, or 86% of the tank volume. This pressure range increase reduces the volume (and cost) requirement by 50% compared to CAES systems.

More advantages may stem from the several smaller production compressors used in the T-Phase Engine instead of a single shaft custom compressor in the CAES product, which may result in two benefits. First, the compression cycle can be operated in almost any power consumption level compared to the "on/off" nature of CAES which adds tremendous flexibility to the T-Phase Engine, such as by being able to match power intake with a variable renewable resource. Secondly, the multiple smaller compressors are readily available and expandable in relatively small blocks and are very inexpensive compared to a large custom-built compressor.

The T-Phase Engine may be retrofitted from a standard turbine section of a gas turbine. Because the expander section of the T-Phase Engine is de-coupled physically or aerodynamically from the compressor, all of the traditional turn down issues associated with the gas turbine's compressor do not exist. This allows for extended turn down which can be very important when the grid is trying to balance a fluctuating renewable resource and/or dynamic power demands. Finally, because the compressor shaft line may be broken down into both a high pressure and a low pressure system, the T-Phase Engine LPICs can operate to create the a "peaker mode" air flow to the T-Phase Engine. This peaker mode can increase the efficacy of the storage plant, by providing extra power during peak demand. FIG. 2 shows a schematic of an engine (e.g., a T-Phase or Turbophase engine) 100, according to an embodiment of the present disclosure. The T-Phase engine 100 may comprise a flow diffuser 106, a modified compressor 107, a conventional combustor 108, a conventional turbine 110, a thrust bearing 113, a clutch/gearbox 114 coupling a shaft 111 of the turbine 110 to a generator 116, and a recuperator 104 configured to receive hot exhaust 112 of the engine 100 to heat air being fed to the recuperator 104 from one or more of a plurality of sources.

Specifically, air may be delivered to the recuperator 104 by any combination of air from an air storage supply 101, one or more Low Pressure Intercooled Compressor (LPIC)

supplies 102, and/or one or more Turbophase or T-Phase Module (TPM) supplies 103. These three air sources are described in more detail below. Independent of where the air is being supplied from, the air may pass through the recuperator 104. The recuperator 104 may consist of a shell and tube heat exchanger with tubes, where the exhaust 112 from the T-Phase engine 100 would flow through the shell and the pressurized air from the air sources 101, 102, and/or 103 would flow inside the tubes. As the pressurized air flows through the recuperator 104, it may extract heat from the exhaust 112 and generate hot compressed air 105. The recuperator 104 of the engine 100 may be selectively configured to have the pressurized air flow 101, 102, and/or 103 through the recuperator 104 and T-Phase engine exhaust 112 at the same flow rate. The pressurized air flow 101, 102, and/or 103 may, however, have some or all their flow be intentionally bypassed around the recuperator 104 for any number of reasons, such as for combustion stability or other temperature constraints (e.g., where it is desired for the pressurized air flow 101, 102, and/or 103 to not extract too much heat).

The hot compressed air 105 may be introduced to the inlet of the compressor 107 through a flow diffuser 106 whose purpose is to take the hot compressed air 105 to an anulus feeding the inlet of the engine 100. At the interface of the flow diffuser 106 and the modified compressor 107, a seal may be located to keep the high pressure air in the flow path and out of the front bearing compartment. The modified compressor 107 may be a substantially empty flow path, where conventional compressor rotating and/or static airfoils (i.e., stators) have been removed. As one skilled in the art can appreciate, the stators typically form the inner diameter flow path between the rotating blades. The T-Phase engine 100 may have newly manufactured compressor blades with extended and interlocked platforms to form the flow path inner diameter. The stators may have the airfoils removed so that just the outer diameter of the flow path exists. The last set of stators, typically referred to as the exit guide vanes, may be left in place to straighten out the flow which exits into the compressor discharge plenum which feeds the combustion system 108. In embodiments, the compressor 107 may be newly constructed as described above, as opposed to modifying an already existing compressor. The modified compressor 107 of the T-Phase engine 100 may passively direct air to the combustion system 108, as opposed to actively directing the air thereto. This feature may be distinct from prior art gas turbine compressors, since it may allow the compressor 107 to function with no power draw (i.e., the compressor 107 may operate without the use of electricity). Because any power drawn by the gas turbine compressor may detract from the net power generated by the gas turbine, this feature may provide a significant advantage over conventional gas turbine engines.

Fuel 109 is delivered to the standard combustion system 108 to elevate the temperature of the air before it is discharged into the turbine section 110 where power is made and delivered out the output shaft 115 (e.g., to the generator 116). FIG. 2 depicts an example hot end drive gas turbine, though however, as one skilled in the art can appreciate, several gas turbine types have cold end drive and the T-Phase engine 100 may accommodate this by passing the output shaft through the flow diffuser 106, in embodiments.

In traditional gas turbines, the forward load developed in the compressor section is somewhat balanced by the aft load generated in the turbine section. With the T-Phase engine 100, since there is no conventional compressor section, there is only an aft load generated in the turbine section. To address this, a thrust bearing 113 may be added somewhere along the shaft line 111. The T-Phase engine 100 embodiments contemplate adding a clutch integrated into or separate from the gearbox 114 such that the generator 166 can continue to spin if the T-Phase engine 100 is off which may provide valuable synchronous condensing function. The output from the thrust bearing 113 and/or the clutch gearbox assembly 114 may drive the generator 116.

Figure 3:
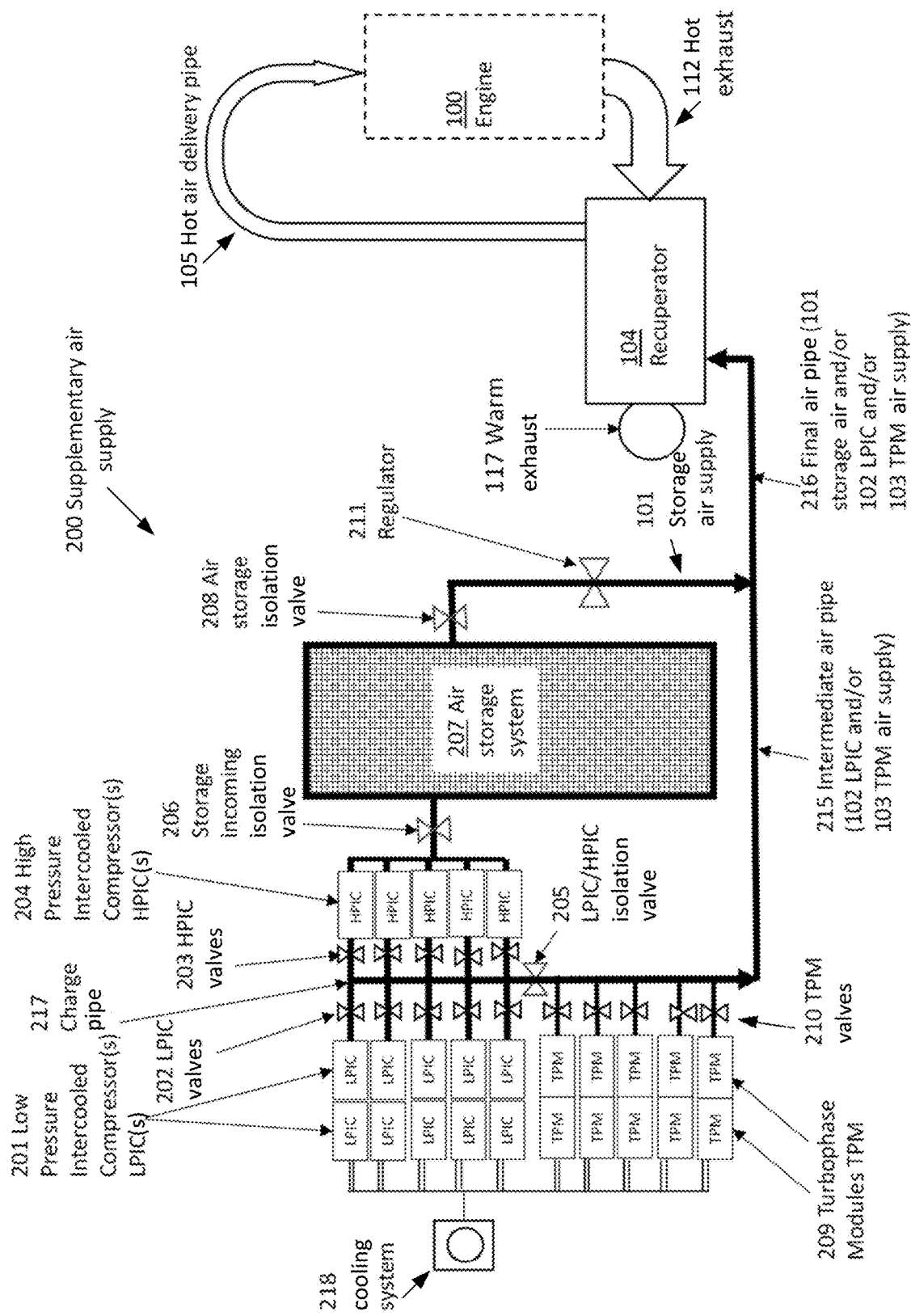
FIG. 3 is a schematic representation of a supplementary air supply system for supplying air to the engine of FIG. 2, according to an embodiment.

In FIG. 3, an example T-Phase engine 100 plant layout is shown with a supplementary air supply 200. One or more LPICs 201 may be arranged to supply a charge air pipe 217, and these LPICs 201 may be isolated from the charge air pipe 217 with one or more LPIC valves 202. The charge air pipe 217 may be in fluid connection with one or more High Pressure Intercooled Compressors (HPIC) 204, and may be selectively isolated from an intermediate air pipe 215 with an LPIC/HPIC isolation valve 205. The charge air pipe 217 may be selectively isolated from the HPICs 204 by one or more HPIC valves 203.

When the T-Phase engine 100 is charging a compressed air storage system 207, the LPIC/HPIC isolation valve 205 may be closed and one or more of the LPIC valves 202 may be open to allow air from the LPICs 201 to flow into the charge pipe 217. The HPIC valves 203 may be open, allowing air from the LPICs 201 to feed into the HPICs 204. In turn, the HPICs 204 may further increase the pressure of the air and route the highly pressurized air towards the air storage system 207. Before the air is delivered to the air storage system 207, the air may pass through a storage incoming isolation valve 206, which may selectively isolate the air storage system 207 from the HPICs 204. When open, the storage incoming isolation valve 206 may allow the HPICs 204 to charge the air storage system 207. When it is desired to store and maintain a supply of pressurized air, the air storage system 207 may be selectively precluded from discharging by closing an air storage outlet isolation valve 208. In embodiments, as described in more detail below, there may be modes of operation where some or all of the air being compressed by the HPICs 204 and the LPICs 201 may be charging the storage system 207 while the LPIC/HPIC isolation valve 205 is partially open, which may allow some of the air from the LPICs 201 to enter the intermediate air pipe 215.

In embodiments, the T-Phase engine 100 may alternately or additionally have one or more TPMs 209 for selectively delivering hot compressed air to the intermediate air pipe 215 via one or more TPM isolation valves 210. Each TPM 209 may be configured to independently produce hot compressed air. For instance, each TPM 209 may have a recuperator which the compressed air produced by the TPM 209 is passed through to extract heat. The recuperator may heat the compressed air by using waste heat and/or exhaust that is generated by other components. For example, the recuperator may heat the compressed air by using waste heat/exhaust from one or more motors (e.g., electrically driven motors, liquid or natural gas fueled motors, etc.) that drive the plurality of TPMs 209 and/or LPICs 201. As another example, the recuperator may heat the compressed air using the exhaust of the T-Phase engine 100. The artisan would understand that any suitable number of LPICs 201 and/or TPMs 209 may be used with the T-Phase engine 100. While the present embodiment may use intercooled compressors in the LPICs, 201, the HPICs 204, and/or the TPMs 209, other embodiments alternately or additionally may cool these compressors 210, 204 and/or 209 through an external cooling system 218. In still more embodiments, the compressors 201, 204, 209 may forego extra cooling steps altogether.

During a power generation mode, the storage exit isolation valve 208 may be opened and air may flow from the storage system 207 through a regulator 211. The regulator 211 may drop the pressure of the air to meet the pressure requirements of the T-Phase engine 100 before the air enters the final air pipe 216. The final air pipe 216 may direct air to the recuperator 104, where the air may be heated with the T-Phase engine 100's exhaust. Additionally, in embodiments, the TPMs 209 may be operated to generate hot compressed air which may also be added to the final air pipe 216. Similarly, in some embodiments, the LPIC valves 202 may be opened and the HPIC valves 203 may be closed so that air from the LPICs 201 may be added to the final air pipe 216 through the intermediate air pipe 215, alternately or additionally to the air from the TPMs 209 and/or the storage tank 207. All of the air in the final air pipe 216, unless it is desired to bypass the recuperator 104 with some or all of the air in the final air pipe 216, may travel through the recuperator 104 where it is heated with the exhaust 112 of the T-Phase engine 100. The heated air may travel to the T-Phase engine 100 through the hot air delivery pipe 105, whereupon it may generate power in the T-Phase engine turbine section 110 (FIG. 2). This may result in the air delivered to the engine 100 dropping in pressure and temperature (e.g., dropping closer to atmospheric air pressure and temperature conditions). The hot exhaust 112 may exit the engine 100 and may be routed through the recuperator 104, where the exhaust 112 may be used to heat the incoming air from the final air pipe 216, and may be released into the atmosphere via the exhaust stack 117 (FIG. 2).

Figure 4:
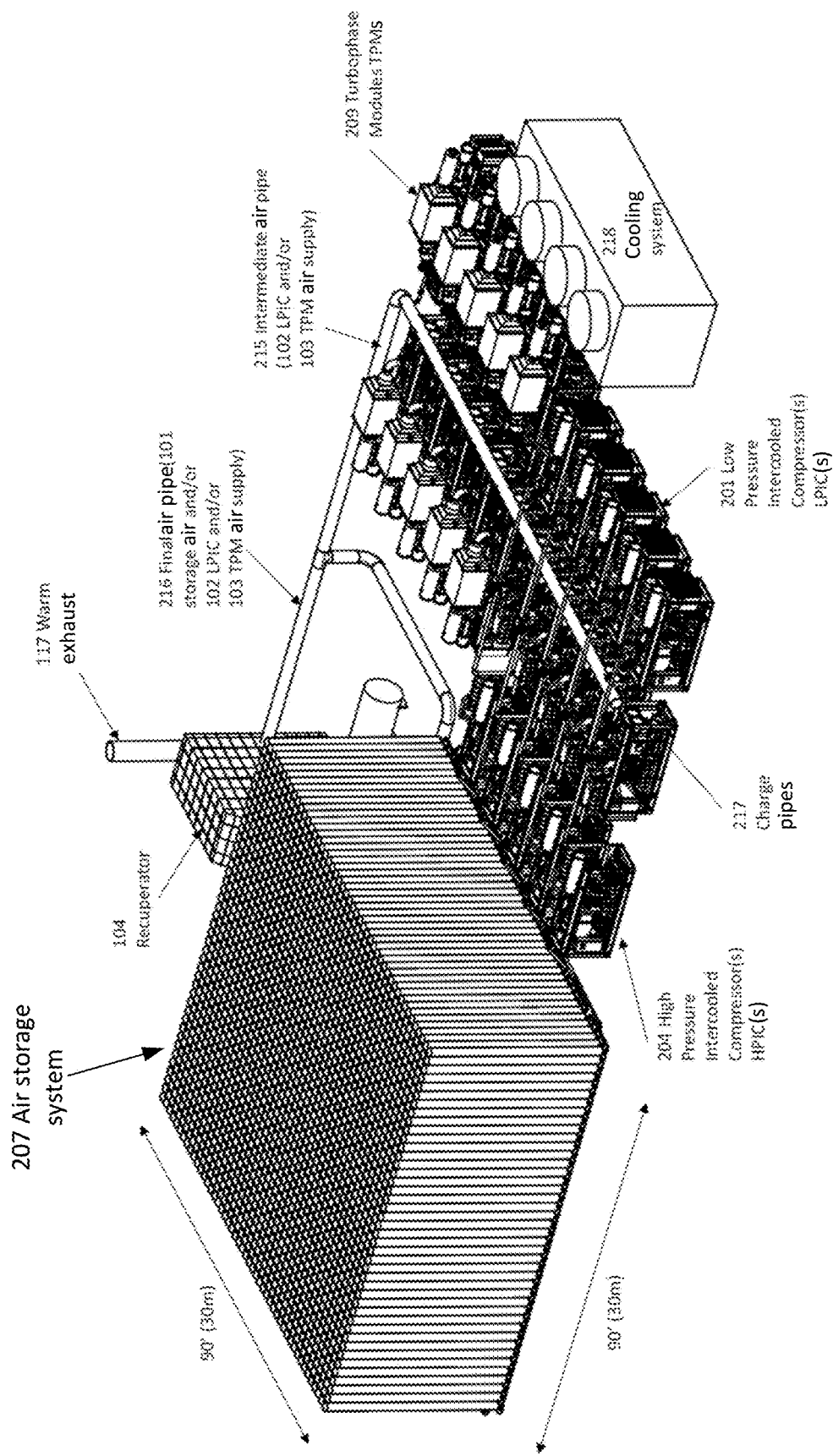
FIG. 4 is a schematic representation of a supplementary air supply system for supplying air to the engine of FIG. 2, according to another embodiment.

FIG. 4 shows an arrangement of the supplementary air supply system 200, in another embodiment. Here, alternate or additional components to the supplementary air supply system 200 may be seen, such as a larger cooling system 218. The cooling system 218 may be used with the LPICs 201, the HPICs 204, and/or TPMs 209 to decrease the temperature of the air being compressed, thus increasing the efficiency of the air compression process. FIG. 5 demonstrates how compact the supplementary air system 200 can be, allowing the T-Phase engine 100 to output power at a similar rate to conventional gas turbine engines while maintaining a smaller footprint. Not only will a smaller footprint decrease the cost of the T-Phase engine and supplementary air system embodiments described herein, but may also allow the embodiments described herein to be situated in more locations, such as those where conventional systems may be too large to be suitable fitted without undue cost.

Figure 5A:
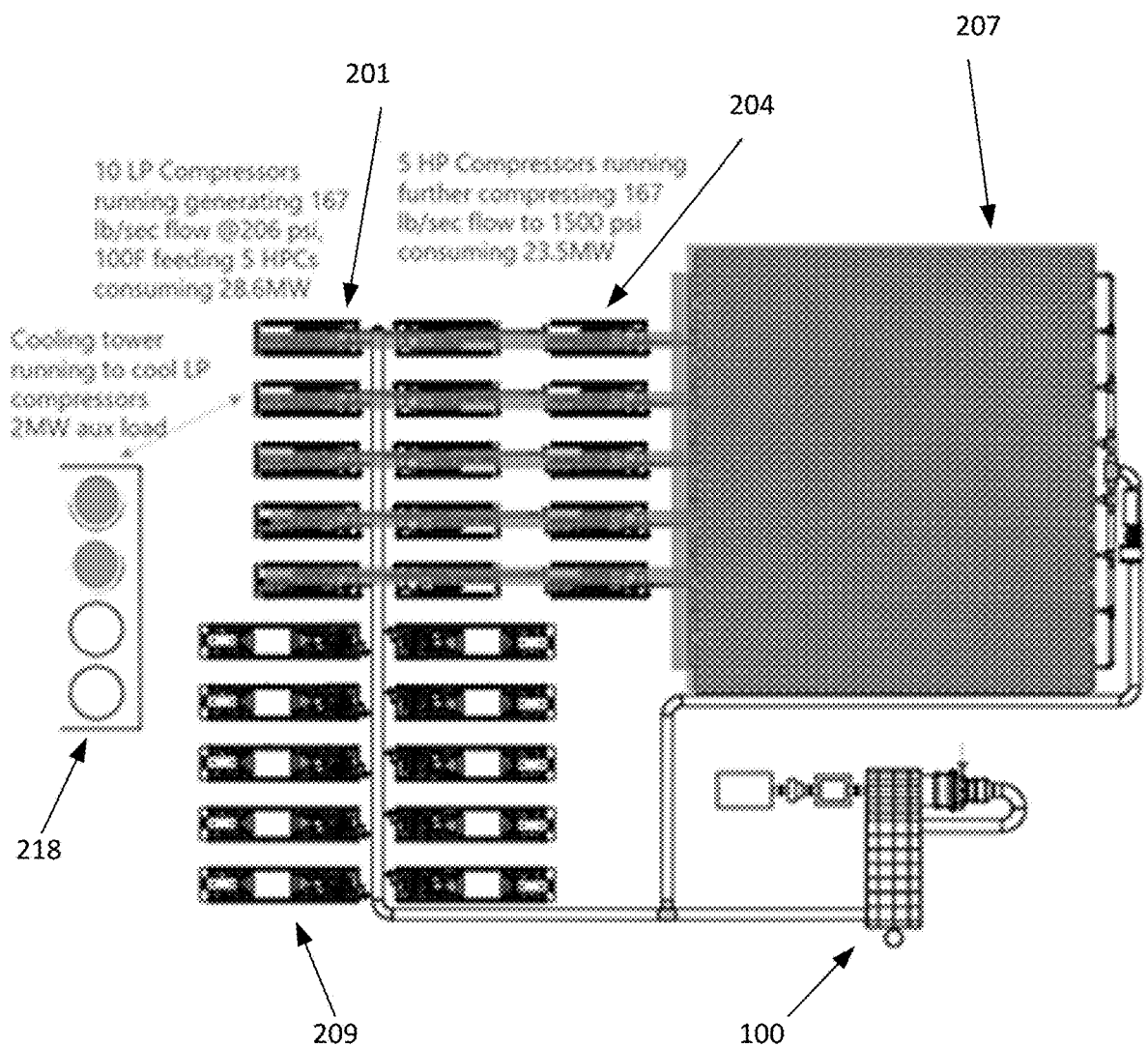
FIGS. 5A-5E are diagrams depicting various methods for using the supplementary air supply system with the T-Phase engine of FIG. 2, in an embodiment.
Figure 5B:
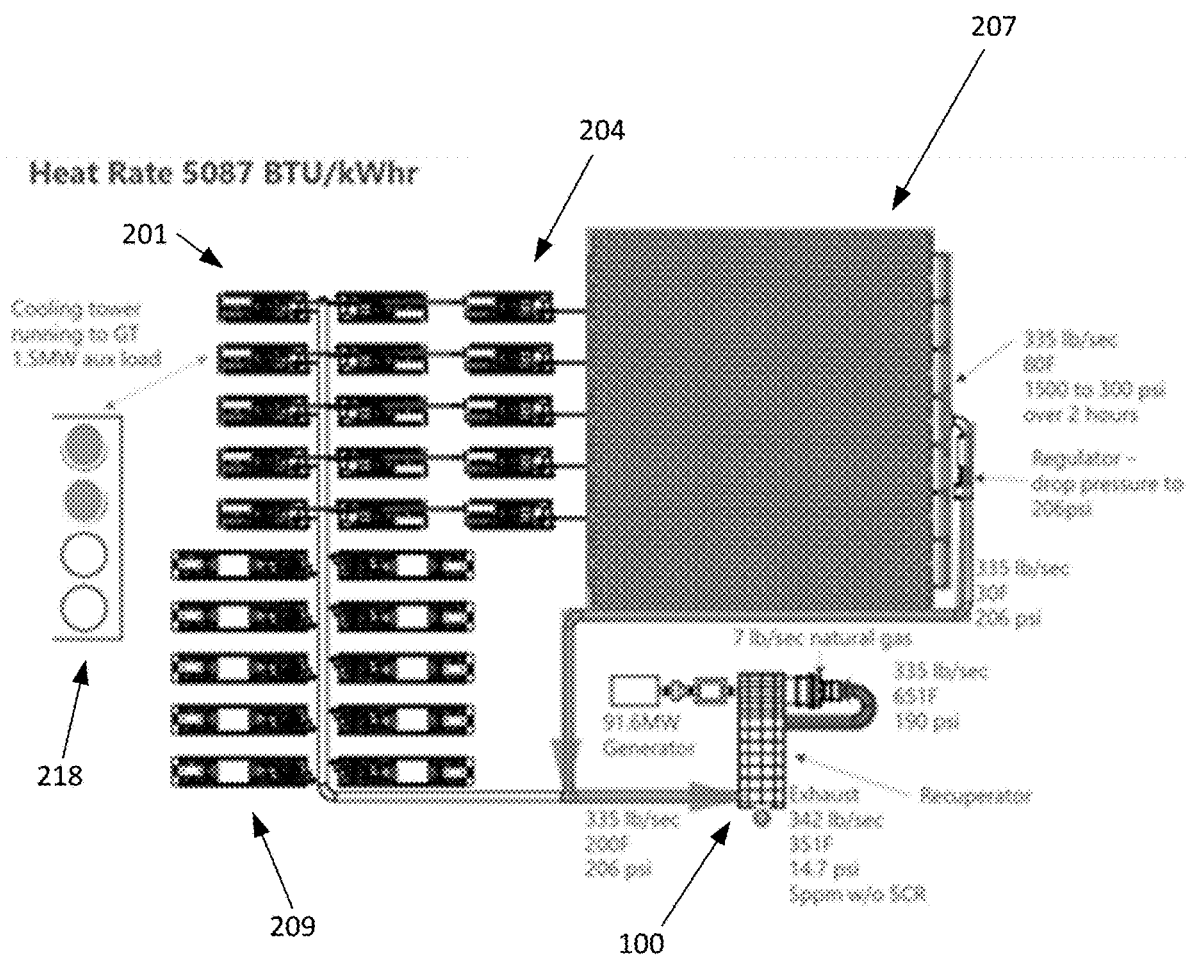
Figure 5C:
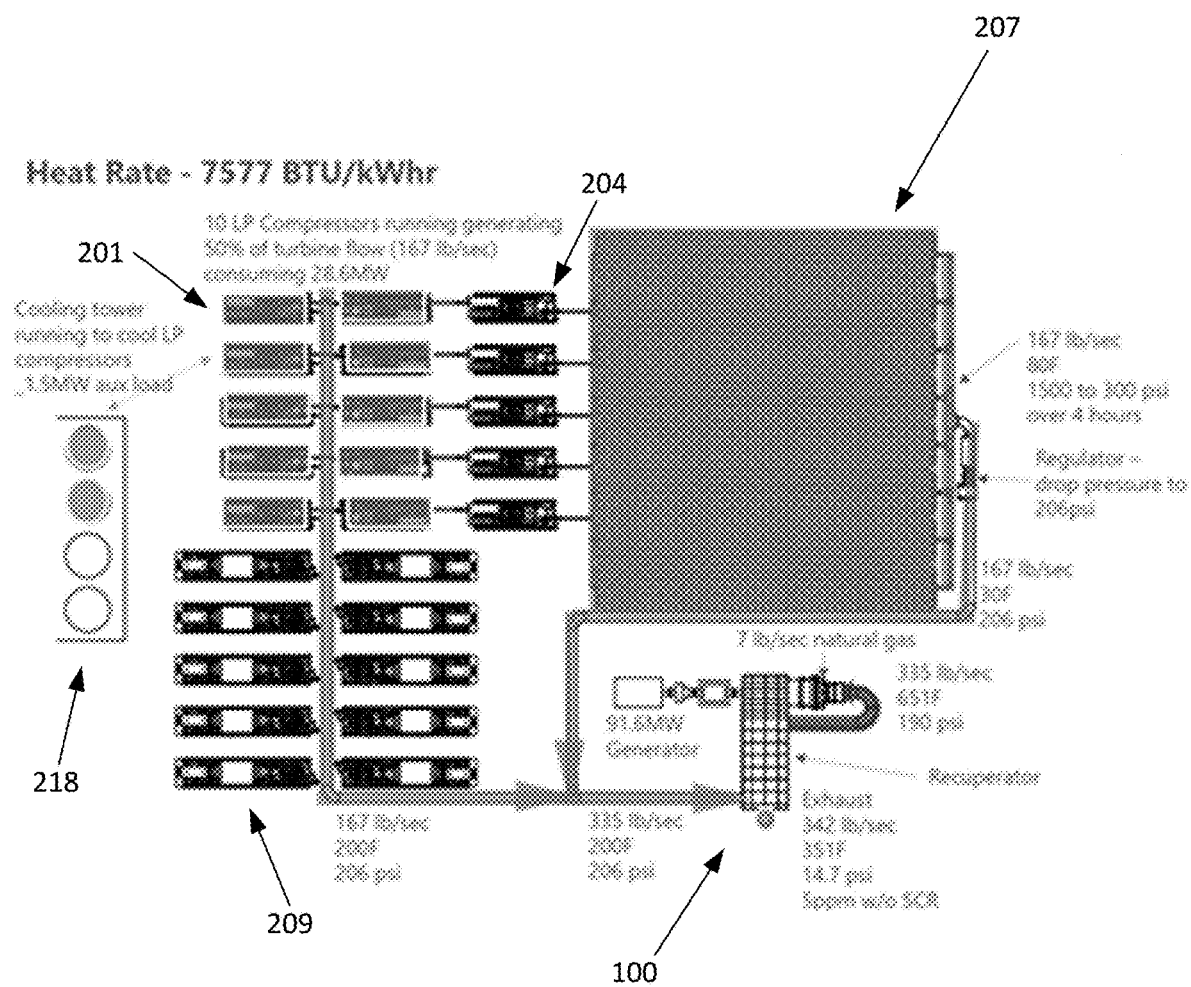
Figure 5D:
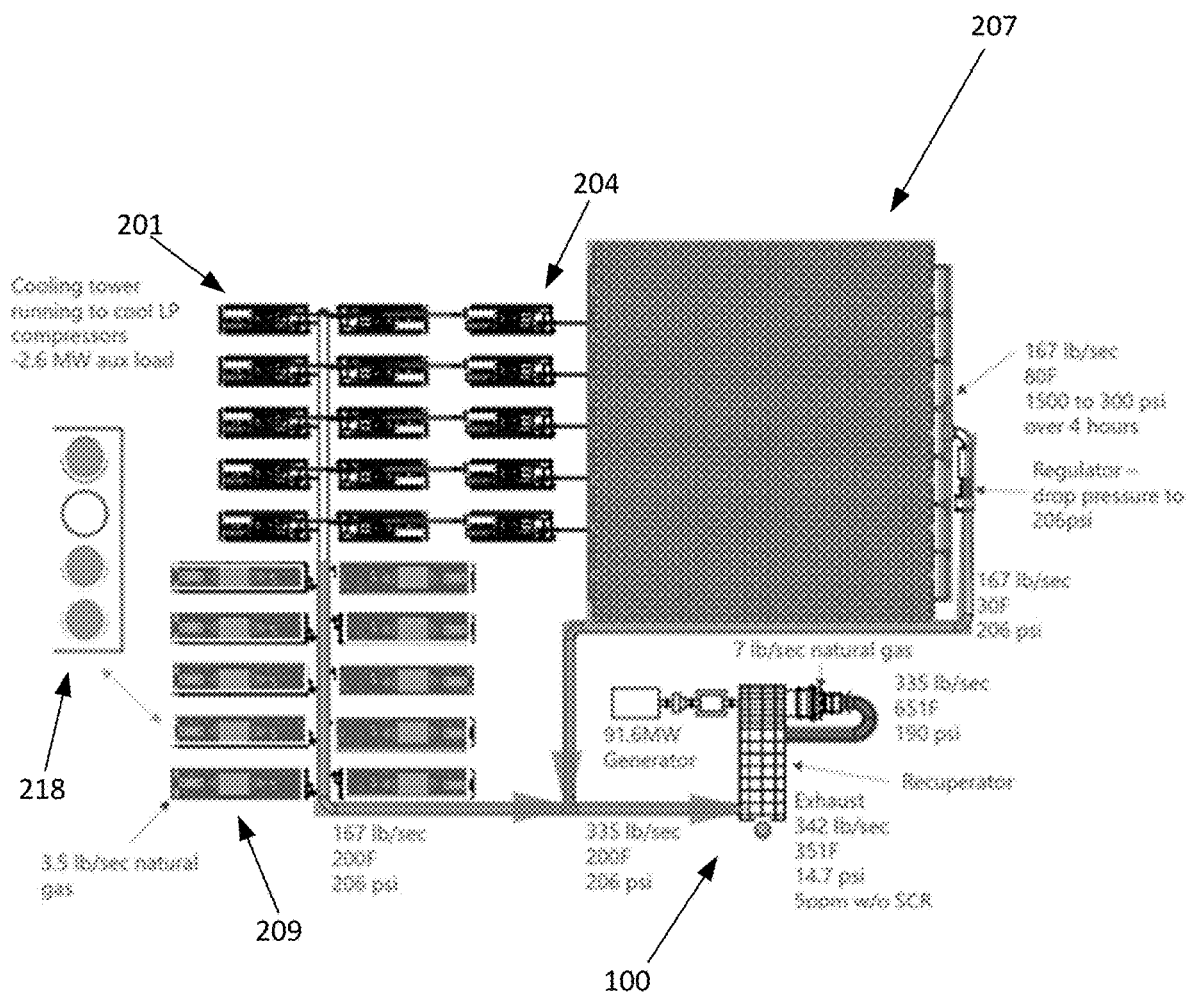
Figure 5E:
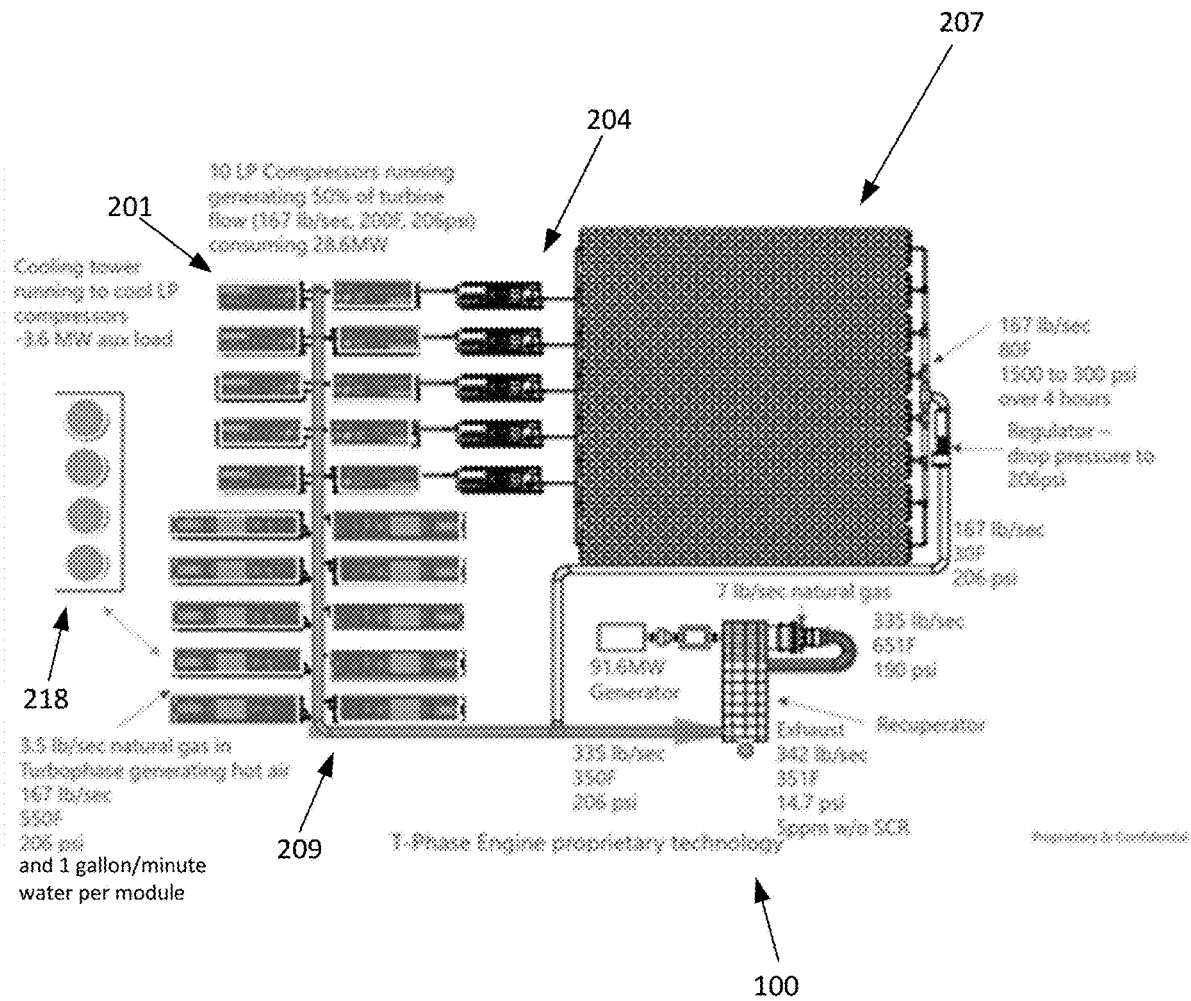

FIGS. 5A-5E depict example operation modes of the grid scale energy storage system. In embodiments, there grid scale energy storage system has a charging mode (FIG. 5A), a discharging mode (FIG. 5B), a combined discharge-electric mode (FIG. 5C), a combined discharge-fuel mode (FIG. 5D), and a peaker mode (FIG. 5E). Each of these modes may have their various advantages, as discussed in more detail below. The shaded regions in FIGS. 5A-5E highlight the regions of the grid scale energy storage plant that are being used in the that particular operation mode.

FIG. 5A shows the charging mode, using the LPICs 201 and the HPICs 204 to store air within the storage tanks 207. Example operation may include using ten LPICs 201 and five HPICs 204, together consuming 52.1 MW and using roughly 2 MW for the cooling auxiliary load, for a total of 54.2 MW maximum power consumption. Each train can run at 70% power, or about 7 MW of input load when at full pressure, so the system has the capability to charge between 15% and 100% of the full rated charging power. Embodiments of the air storage tanks 207 may take about four hours to fully charge. The charging mode may be used when energy demand is low (i.e., when the power output of the grid scale energy storage plant is not needed) and/or whenever it is desired to charge the air storage tanks 207.

FIG. 5B shows the plant in the discharging mode, where air is discharged from the air storage tanks 207 to operate the engine 100 and produce power. The engine 100 may be operated with air from only the storage tanks 207. The air is discharged from the tanks 207 at about twice the flow rate the tanks were charged at. In this example, that means the tanks 107 would drop in pressure from 1500 psi to 300 psi over two hours. As the air is released from the tanks, the pressure is dropped to 206 psi in the regulator 211, then introduced to the counter flow recuperator 104 where the exhaust from the engine 100 is used to heat the air to a similar temperature that, for example, the 6B gas turbine would normally experience during a maximum flow and power condition. If the heat and mass balance results in the air exiting the recuperator 104 being hotter than desired, air can be bypassed around the recuperator 104 to reduce the temperature of the air entering the engine 100. As one skilled in the art can appreciate, there may also be several compressor bleeds that are used for cooling later stages in the engine 100 with lower temperature and lower pressure (lower than the maximum pressure entering the combustion system). These bleed flows can be delivered by taking air from the recuperator 104, either at the exit or somewhere in the middle where the desired temperature is achieved, and regulate the pressure lower to the desired pressure. After the regulator 211, losses in the air pipes 2016 and 105, and the recuperator 104, the pressure of the air being introduced to the engine 100 is substantially the same that the engine 100 would normally experience during a maximum flow and power condition. At this point, the air entering the combustion system of the engine 100 has a similar pressure and temperature to a normal operating point. Therefore, existing combustor and turbine may be optimally designed and do not need any modifications. Only the compressor 107 may require retrofitting and/or modification. This is significant since combustors and turbines are extremely expensive to manufacture and maintain if they were custom built. A typical 6B gas turbine turbine's section produces 91.6 MW of power at these conditions, and in the case of the engine 100, there is no compressor load, so the entire 91.6 MW may be used to generate electricity. There is approximately 1.5 MW of auxiliary load in this condition, so the net power is 90.1 MW for 2 hours at a heat rate of 5087 BTU/kWhr.

FIG. 5C shows the plant in the combined discharge-electric mode, where the tanks 207 are discharged at the same flow rate as they were charged with (i.e., half the maximum design flow for the engine 100). At the same time, the electric driven compressors 201 are operated to produce the other half of the air flow to deliver the maximum design flow to the engine. In this example, the engine 100 generates 91.6 MW, however the LPICs 201 consume about 30.1 MW, netting 61.5 MW for the duration of the discharge of the air tanks 207. This mode may be important, considering many markets require 4 hours of capacity from their energy plants to be eligible for a capacity payment. Additionally, since the electric compressors 201 start in less than 60 seconds (i.e., quicker than existing fueled compressors), they can be used to reduce the net power output from the engine 100 quite quickly if needed.

FIG. 5D shows the plant in the combined discharge-fuel mode. This mode may be similar to the combined discharge-electric mode, however, instead of half of the air mass flow being generated using electrical driven LPCs 201, fuel is used to drive the Turbophase modules 209 instead. This would result in a system where all power generated except for the auxiliary cooling load being available to the grid. In this example, that would be 89 MW. Since the Turbophase modules 209 have the capability to generate hot compressed air by using the exhaust of the fueled engine that is driving the Turbophase compressor to heat up the compressed air in a recuperator, that hot air can be used to preheat the combustor 108 and the turbine section 110 of the engine 100. This may reduce the thermal stress experienced by the engine 100 during engine 100 start-up, as well as reducing engine 100 start-up time. The combine discharge-fuel mode may also be advantageous over the combined discharge-electric mode where more net power is required to be delivered to the grid, for example. As another example, fuel (e.g., natural gas, diesel, etc.) costs may be low during certain periods of time, making the combined discharge-fuel mode quite cost effective.

In embodiments, the engine 100 is arranged with a clutch 114 between the engine 100 and the generator 116, allowing the generator 116 to be synchronized to the grid without the engine 100 operating. During a normal gas turbine start-up, which typically takes about 15 minutes, about 5 minutes of that time is used to get the generator 116 synchronized to the grid and the last 10 minutes is used to ramp-up the system. The ramp-up may consist of building pressure in the compressor 107 and heating the engine 100 to prevent rubs in the compressor 107 and turbine section 110, as well as minimizing undue thermal stresses. By preheating the system with the Turbophase modules 209, the start time can be reduced to approximately 5 minutes.

One other characteristic of the Turbophase modules 209 is that the Turbophase modules 209 can be outfitted with generators as well as a compressor, and therefore can be used to generate power and/or to generate compressed air. For example, the Turbophase modules 209 could be run to generate station power to start the engine 100, keep the engine 100 warm for a fast start, and/or to generate power during a peak output scenario. In the peak output scenario, the engine 100 may be run in the discharge mode (i.e., exclusively off of the air from the storage tanks 207) or in the combined discharge-electric mode (i.e., using both air from the LPCs 201 and the storage tanks 207) while the Turbophase modules 209 operate their own generators to produce extra power. To illustrate an example, another 25 MW can be added to the grid using the Turbophase modules 209 while the engine 100 is delivering 90 MW utilizing the air from the tanks 207 only, for a total output of 115 MW. If the LPCs 201 are also being used, the engine would generate a net of 60 MW, for a total output of 85 MW.

FIG. 5E depict the plant in the peaking mode, where the air tanks 207 are empty or otherwise not being used. In the peaking mode, air from the just the LPCs 201 and the Turbophase modules 209 is used to operate the engine 100. This results in a continuous operating mode that may net, in this example, 60 MW for the grid. This peaking mode may be advantageous to use where power is required to be delivered to the grid even after the air in the storage tanks 207 is expended.

The LPCs 201, the HPCs 204, and the Turbophase modules 209 may have an inherent characteristic where they generate water from the air that is being compressed. This creates an opportunity to further increase the power output of the engine 100. Each module 201, 204, and 209 may generate, for example, one gallon of clean water per minute. This clean water may be suitable for injection in to the engine 100 to further increase the mass flow therethrough, thus increasing the power output of the engine 100. Assuming the engine 100 cycles once per day (e.g., charges for four hours on solar power mid-day) and discharges for 4 hours, (e.g., two hours during the morning peak demand and two hours during the evening peak demand), and runs in peaking mode for about three-hundred-fifty hours per year, the water stored throughout the year is enough to generate an additional 10% more power during the three-hundred-fifty hours per year the engine 100 is in the peaking mode. Using the above example numbers, this would result in an additional 9 MW output during the peaking mode. This feature may allow the engine 100 to have the capability to seasonally shift energy. For instance, if the storage engine plant was 100% air cooled and the water from the non-peak months of the year was stored, a zero-water consumption engine 100 may use water or steam injection to create an additional 9 MW of power on peak points for three-hundred-fifty hours a year when it is most needed.

Figure 6C:
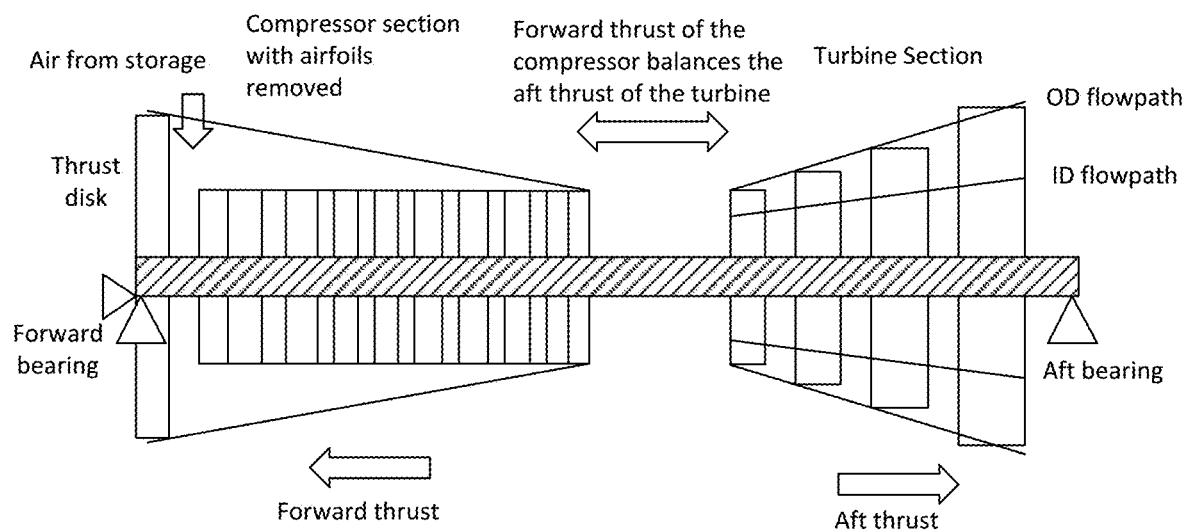

Turning now to FIGS. 6A-6C, example compressor 107 configurations are shown, in embodiments. As one skilled in the art can appreciate, there are several methods to execute "removing" the compressor 107 blades or otherwise modifying the compressor 107 to have stationary blades, in order to create the engine 100 described herein. Any suitable method now known or subsequently developed to arrive at the described modified compressor 107 may be used.

One example method may be to eliminate the existing compressor all together and introduce a new shaft and bearing system that takes the place of the rotor in the compressor 107. The engine 100 may therefore be shortened, thus reducing the overall footprint of the engine 100. Another example option for retrofitting the conventional turbine engines may be to cut off the compressor blades at the platforms and leave the stators in place. This approach may be the simplest and least expensive to execute. Another option maybe to cut off the compressor blades at the platforms and take the stators out. Then, the stator airfoils having a camber may be removed and replaced with straight struts. This approach may still be inexpensive to execute and the plurality of cambered airfoil stators may be replaced with a fewer number of straight struts. This approach may minimize the changes to the rotating section and may have minimal pressure losses while preserving the flowpath.

Yet another option is to redesign the rotating compressor airfoils. The airfoils may be redesigned to have the airfoils extend axially forward and aft such that they come close to each other and/or interlock with each other. This may result in an inner diameter flowpath. The stator blades may be cut off entirely and the outer diameter flowpath part of the stator may be reused. By doing this, the compressor flowpath may be clean. In all three of the above described scenarios, there may be a net axial thrust introduced which will be too large for the existing thrust bearing. As one skilled in the art can appreciate, not all of the compressor blade rows must be removed to substantially accomplish the same effect. For example, one or more of the last stages of the compressor stator and rotor could be left intact, which would have the effect of raising the pressure at the entrance of the combustion section. This may balance out the undue aft thrust described above.

With the compressor rotating airfoils removed, a large portion of the forward thrust that the pressure on the rotating compressor blades generated may be removed, which will result in a large axial aft net thrust load on the rotor, as shown in FIG. 6B. To handle this issue, a thrust bearing and/or a thrust disk 300 may be located on the compressor shaft to create forward thrust, as shown in FIG. 6C. Optionally, a thrust disk 300 could be introduced between the turbine and where the pressurized air is being introduced in such a way that the aft thrust on the turbine is counterbalanced by the forward thrust on the newly added thrust disk 300. In effect, the newly added thrust disk 300 would create the forward thrust that was originally created by the compressor's blades, thus allowing any existing thrust bearings on the existing gas turbine to be used.

Figure 7:
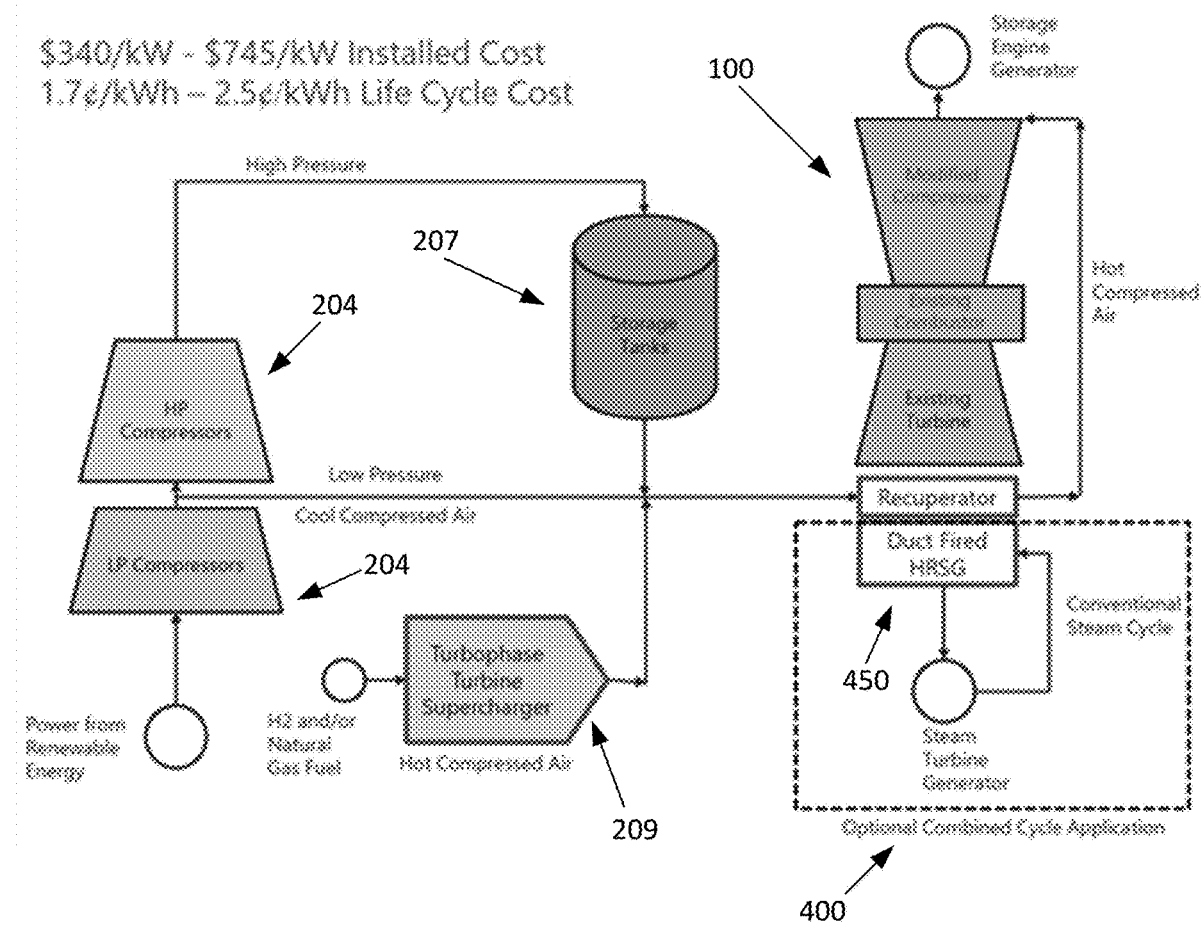
FIG. 7 is a schematic representation of the engine of FIG. 2 in a combined cycle application, according to an embodiment.

If desired, the combined cycle 400 (FIG. 7) aspect of a traditional combined cycle gas turbine plant may be incorporated into the engine 100. During the peaking mode of the engine 100, the Turbophase modules 109 and the LPCs 201 may be operating to deliver compressed air to the engine 100. In this situation, the LPC 201 output air can bypass the aftercooler, which will result in air being delivered at approximately 230 F, and the Turbophase modules 209 may deliver air, at approximately 550 F (because of the exhaust heat recovery recuperator), for a blended air temperature of 390 F. Then the recuperator 104 on the exhaust 112 of the engine 100 would have to increase the temperature to 850 F (for F class), or a temperature rise of 460 F. Since the exhaust flow 112 of the engine 100 and the inlet flow 105 of the engine 100 are practically the same flow rate, the exhaust flow temperature will have a corresponding drop in temperature, or 460 F. This temperature reduction can be boosted back up with duct firing between the recuperator 104 and a heat recovery steam generator 450 (FIG. 7), which will increase the gross output of the steam engine 100. Of course, as one skilled in the art can appreciate, if duct firing is not desirable, there is still considerable heat left in the exhaust 112 of the engine 100 after the recuperator 104, which, for example, may result in approximately 12% of the engine 100 output.

Table 1 below shows an example $/kwh cost analysis of the engine 100, based on the rated output and on a life cycle cost. The financial analysis was performed using a discount rate of 8.25%, $3/MWhr maintenance cost based on the output of the engine 100 with a 3% escalation of maintenance cost of the engine 100, a typical utility outlook on fuel costs where fuel went from $2.74.mmBTU to $6.4 mmBTU for 30 years, and a installed cost of solar of 5cents/kwh. The results of this financial analysis, using these very conservative assumptions, are shown in the table below for a 7F based engine 100. The latest numbers available from independent power producers who are quoting relatively large battery systems report a $/kWhr cost of approximately $350/kWh for a 4 hour battery, or $1400/kW. Or for an 8 hour battery it would be double, $2800/kW. As a comparison to the storage engine, a 408 MW-8 hour battery would cost $1,142M USD and if it was cycled 20% of its rated power, or 82 MW per day for 8 hours, or 652 MW-hrs per day, then over 30 years it would generate 7 million MWhr of stored energy dispatched to the grid. If you assume that 70% of the original price was the batteries and that you replaced them after 15 years, with an 8.25% discount rate, it will result in a $1,736M USD net present value, or levelized cost of energy of $250/MWhr life cycle cost, or 25 cents/kWhr life cycle cost with a $2,800/kW power rating cost and a $350/kwh energy rating cost. In comparison, the engine 100 may fully discharge the entire 408 MW for 8 hours per day, or 35 million MWhr of energy (five times the energy delivered to the grid), at a cost of $596/kW (20% cost of batteries) and a life cycle cost of 1.8 cents/kWh (7% life cycle cost of batteries).

TABLE 1

Cost analysis of the engine 100

|  |  | Capital Cost mUSD | Life Cycle Cost (cents/kWh) | $/kW Installed cost | Charge time | Discharge Time | Simple cycle | | Combined Cycle | |
| --- | --- | --- | --- | --- | --- | --- | --- | --- | --- | --- |
|  |  |  |  |  |  |  | Power Output (MW) | Heat Rate | Power Output (MW) | Heat Rate |
| w/o TPM |  | $ 139 | 2.5 | $ 341 | 4 | 2 | 408 | 4498 | 458 | 4007 |
|  |  | $ 195 | 2.0 | $ 478 | 8 | 4 |  |  |  |  |
|  |  | $ 256 | 1.9 | $ 627 | 12 | 6 |  |  |  |  |
| w TPM |  | $ 187 | 2.2 | $ 458 | 4 | 4 | 408 | 6364 | 531 | 4890 |
|  |  | $ 243 | 1.8 | $ 596 | 8 | 8 |  |  |  |  |
|  |  | $ 304 | 1.7 | $ 745 | 12 | 12 |  |  |  |  |
|  |  |  |  |  | n/a | Continuous | 313 | 8294 | 435 | 7235 |

Embodiments of the T-Phase engine and supplementary air supply described herein may use relatively small components (e.g., a smaller air storage system) and/or may use relatively less components, thusly achieving a smaller footprint than their conventional counterparts. As a result of the use of commonly available technology and equipment combined with the unique operating modes available, an estimated project cost of $56M USD can be realized for the 6B equivalent T-Phase engine, in an embodiment. This results in extremely low capital cost for the storage system ($150/kWhr), which is about $\frac{1}{8}^{th}$ the cost that conventional batteries advertise, in addition to their much shorter lifetime. Additionally, if one considers the Levelized Cost of Energy (LCOE) for the system, including the fuel burn of the TPMs 209 and the T-Phase engine 100 for a 4 hour/89.6 MW discharge at $2/MMBBTU fuel, it will come out to $6/MWhr, which is less than $\frac{1}{10}^{th}$ of the rate conventional batteries claim.

Resultantly, the T-Phase engine technology may have substantially increased commercial viability over traditional CAES (and other) plants while at the same time allowing the product to be situated in more locations.

As one skilled in the art can appreciate, instead of modifying an existing gas turbine to have a bladeless compressor, a new design could be developed that eliminates the gas turbine compressor altogether (e.g., by developing a static tunnel which is designed to passively direct incoming air, as described previously). This new design may be used to replace the compressor of the existing gas turbine engines. In other words, existing gas turbine may be retrofitted as described herein to use a bladeless compressor, without having to modify the rest of the existing gas turbine engine. In this way, existing gas turbine engines may be easily and cheaply converted to operate within the grid scale energy storage plant embodiments described herein. Alternatively, in embodiments, new gas turbine engines having a static compressor may be used in the various grid scale energy storage plant embodiments described herein.

Other options are also available to favorably decrease the start time of the T-Phase engine 100 by using a TPM 209 to inject hot air into the T-Phase engine 100 directly to preheat the engine 100. One skilled in the art would also appreciate that the various embodiments of the T-Phase engine and supplementary air supply system described herein may be implemented in any suitable combination. Further, while embodiments described herein used particular arrangements of T-Phase engine and supplementary air system components, any suitable number, size, and/or arrangement of the components described herein may be utilized to create a T-phase engine and supplementary air system that outputs a desired amount of power. For example, the number of TPMs 209, LPICs 201, and HPICs 204 may be reduced/increased to create a system that can produce less/more power than specific embodiments described herein. Table 1 below shows various example arrangements for the T-Phase engine and supplementary air system that may output power similar to various conventional gas turbine sizes. Those of skill in the art would understand that any suitable number, size, and/or arrangement of components of the T-Phase engine and supplementary air system described herein may be used to create a power generation system that is comparable to its conventional gas turbine counterpart, such as a 6B gas turbine, a 7E gas turbine, a 7FA gas turbine, et cetera. Those of skill in the art may also appreciate that a T-phase engine and supplementary air system, when compared to its conventional counterpart, may have a comparatively reduced foot print size. This may be advantageous where it is desirable to reduce the space and cost of a gas turbine system.

TABLE 2

Various characteristics of T-Phase engines sized to their conventional counterparts

|  | 6B | 7E | 7FA |
|---|---|---|---|
| Max Expander flow rate (Lb/sec) | 335 | 670 | 1000 |
| output -storage only (MW) | 90 | 180 | 400 |
| tank farm dimensions (feet) | 90 × 90 | 125 × 125 | 160 × 160 |
| Plant footprint (feet) | 150 × 210 | 225 × 250 | 300 × 400 |
| HR storage air only (BTU/kWhr) | 5088 | 5088 | 3731 |
| Peaker output - TPM + LPC | 60 | 120 | 300 |
| HR Peaking (BTU/kWhr) | 10712 | 10712 | 7855 |
| number of TPM | 11 | 22 | 33 |
| Number LPC | 10 | 20 | 30 |
| Number of HPC | 5 | 10 | 15 |

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure. It will be understood that certain features and subcombinations are of utility and may be employed without reference to other features and subcombinations and are contemplated within the scope of the present disclosure.

The disclosure claimed is:

1. A method of modifying an existing gas turbine to create a storage engine, the gas turbine having a combustor, a compressor section, and a turbine section, the method comprising modifying the compressor section of the gas turbine to form the storage engine such that air supplied to the combustor of the storage engine is heated by exhaust of the storage engine and is supplied from a remote source, where modifying the compressor section includes removing rotating blades of the compressor and introducing an increased capacity thrust bearing on a shaft line, and where compressor stators are modified and airfoil stators are replaced with struts.

2. The method of claim 1 where the remote source of air is a compressed air storage tank.

3. The method of claim 1 where the remote source of air is a combination of a compressed air storage tank and low pressure compressors.

4. The method of claim 1 where the remote source of air includes low pressure compressors.

5. A method of modifying an existing gas turbine to create a storage engine, the gas turbine having a combustor, a compressor section, and a turbine section, the method comprising modifying the compressor section of the gas turbine to form the storage engine such that air supplied to the combustor of the storage engine is heated by exhaust of the storage engine and is supplied from a remote source and a cooling air supply for later stages in the turbine section is supplied from air that is from the remote source and is heated by the exhaust of the storage engine, where modifying the compressor section includes removing rotating blades of the compressor and introducing an increased capacity thrust bearing on a shaft line, and where a compressor stator airfoil and an inner diameter portion are completely removed, leaving just the outer diameter flowpath.

6. A method of modifying an existing gas turbine to create a storage engine, the storage engine having at least a substantially unmodified gas turbine combustor and turbine section and a modified compressor section such that air supplied to the combustor of the storage engine is heated by exhaust of the storage engine and is supplied from a remote source and cooling air supply for the turbine section is supplied from air that is from the remote source and heated by the exhaust of the storage engine, where modifying the compressor section includes removing rotating blades of the compressor and introducing an increased capacity thrust bearing on a shaft line, a compressor stator airfoil and an inner diameter portion are completely removed, leaving just the outer diameter flowpath, and where compressor rotating airfoil platforms are extended both forward and aft to create an inner diameter flowpath.

7. A method comprising modifying an existing gas turbine to create a storage engine, the storage engine having a substantially unmodified gas turbine combustor and turbine section and a modified compressor section such that air supplied to the combustor of the storage engine is heated by exhaust of the storage engine and is supplied from a combination of stored air in a tank and a fueled engine driven compressor such that when the storage engine is not in operation, the fueled engine driven compressor can be run independently of the storage engine and be used to pre-heat the storage engine to reduce start up time, where modifying the compressor section includes removing compressor rotating blades and introducing a thrust disk on the shaft line, and where compressor stators are modified and airfoil stators are replaced with struts.

8. A method comprising modifying an existing gas turbine to create a storage engine, the storage engine having a substantially unmodified gas turbine combustor and turbine section and a modified compressor section such that air supplied to the combustor of the storage engine is heated by exhaust of the storage engine and is supplied from a combination of stored air in a tank and electric driven compressors and fueled engine driven compressors such that the fueled engine can be run independently of the storage engine to generate power, where modifying the compressor section includes removing compressor rotating blades and introducing a thrust disk on the shaft line, and where a compressor stator airfoil and an inner diameter portion are completely removed, leaving just the outer diameter flowpath.

9. A method comprising modifying an existing gas turbine to create a storage engine, the storage engine having a substantially unmodified gas turbine combustor and turbine section and a modified compressor section such that air supplied to the combustor of the storage engine is heated by exhaust of the storage engine and is supplied from a combination of stored air in a tank and real time running low pressure compressors, the method further comprising injecting water generated during an intercooling processor of the compressor into the storage engine when the storage engine is operational to generate additional power from the storage engine, where modifying the compressor section includes removing compressor rotating blades and introducing a thrust disk on the shaft line, a compressor stator airfoil and an inner diameter portion are completely removed, leaving just the outer diameter flowpath, and where the compressor rotating airfoil platforms are extended both forward and aft to create the inner diameter flowpath.

* * * * *